United States Patent
Wang

(10) Patent No.: US 7,136,384 B1
(45) Date of Patent: Nov. 14, 2006

(54) SYSTEM AND METHOD FOR COMMUNICATING ASYNCHRONOUS TRANSFER MODE CELLS IN A NETWORK ENVIRONMENT

(75) Inventor: Li T. Wang, Frisco, TX (US)

(73) Assignee: Cisco Technology, Inc., San Jose, CA (US)

( * ) Notice: Subject to any disclaimer, the term of this patent is extended or adjusted under 35 U.S.C. 154(b) by 1158 days.

(21) Appl. No.: 10/103,397

(22) Filed: Mar. 19, 2002

(51) Int. Cl.
*H04L 12/56* (2006.01)

(52) U.S. Cl. .................................. 370/395.1; 370/466
(58) Field of Classification Search ............... None
See application file for complete search history.

(56) References Cited

U.S. PATENT DOCUMENTS

| | | | |
|---|---|---|---|
| 5,809,024 A * | 9/1998 | Ferguson et al. ...... 370/395.53 |
| 5,946,313 A * | 8/1999 | Allan et al. .................. 370/397 |
| 6,891,825 B1 * | 5/2005 | O'Dell et al. ............... 370/352 |
| 2002/0110124 A1 * | 8/2002 | Fujita .......................... 370/389 |
| 2002/0174251 A1 * | 11/2002 | Lasserre ..................... 709/249 |
| 2004/0213252 A1 * | 10/2004 | Lee et al. ................ 370/395.1 |

* cited by examiner

*Primary Examiner*—Chi Pham
*Assistant Examiner*—Anh-Vu Ly
(74) *Attorney, Agent, or Firm*—Baker Botts L.L.P.

(57) ABSTRACT

A method for communicating data is provided that includes receiving an asynchronous transfer mode (ATM) cell at a line card and generating an Ethernet frame that comprises the received ATM cell, an Ethernet-compatible header, and a data integrity element. The Ethernet frame is communicated to a first destination. The Ethernet frame is received at the first destination and directed to a second destination. At the second destination, the Ethernet frame is segmented into portions and reassembled in order to form an Ethernet packet. The Ethernet packet is then communicated to the first destination.

25 Claims, 3 Drawing Sheets

ETHERNET FRAME

ATM CELL

ETHERNET WRAPPER AROUND ATM CELL

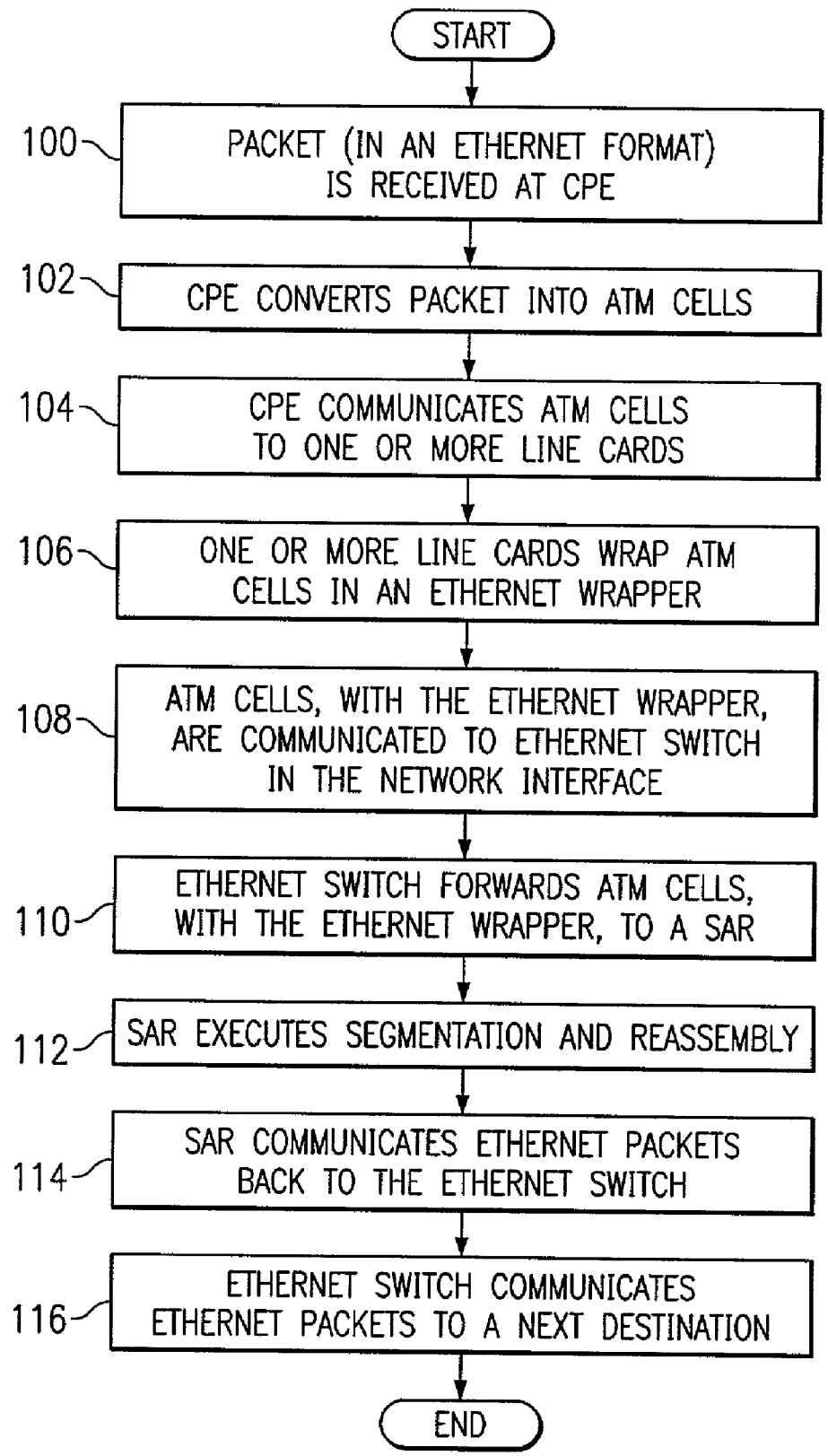

US 7,136,384 B1

SYSTEM AND METHOD FOR COMMUNICATING ASYNCHRONOUS TRANSFER MODE CELLS IN A NETWORK ENVIRONMENT

TECHNICAL FIELD OF THE INVENTION

This invention relates in general to asynchronous transfer mode (ATM) communications, and more particularly to a system and method for communicating ATM cells in a network environment.

BACKGROUND OF THE INVENTION

Communication architectures have grown increasingly complex and sophisticated in today's network environment. One aspect of communication architectures relates to the compatibility of diverse technologies and communication protocols, which are both often prevalent in a single network. Communication interfaces in the network may generically address the issue of compatibility but suffer from numerous drawbacks. For example, communication interfaces generally inhibit potential future enhancements to existing network equipment. This is because the interfaces may be custom designed to specifically match the existing network equipment. As a result, future integrations are constrained and generally require complex strategies that must address (or remove) the existing custom-designed solution before implementing the next enhancement or system upgrade. In addition, these communications interfaces may require significant modifications to existing network components, modifications which are expensive and which slow the communication flows in the network while occupying valuable real estate within network equipment. These interfaces may also impose power strains on network architecture and cause associated power limitations to be exceeded.

SUMMARY OF THE INVENTION

According to one embodiment of the present invention a method for communicating data is provided that includes receiving an asynchronous transfer mode (ATM) cell at a line card and generating an Ethernet frame that comprises the received ATM cell, an Ethernet-compatible header, and a data integrity element. The Ethernet frame is communicated to a first destination. The Ethernet frame is received at the first destination and directed to a second destination. At the second destination, the Ethernet frame is segmented into portions or reassembled in order to form an Ethernet packet. The Ethernet packet is then communicated to the first destination.

Certain embodiments of the present invention provide a number of technical advantages. For example, according to one embodiment of the present invention a line card architecture is provided that includes an Ethernet encapsulator which converts ATM cells into an Ethernet-compatible format. The line card operates in conjunction with existing network equipment to allow ATM cells to be properly received in an Ethernet format at the network interface.

Another technical advantage of one embodiment of the present invention is a result of the position of segmentation and reassembly (SAR) element. The SAR function is removed from the line cards and may be positioned on the network interface, on a separate line card, or on a dedicated piece of hardware. This architecture is more economical as the SAR task is performed by a single element at a designated location. The single point SAR designation also offers greater flexibility to a communication system because network equipment that interacts with a SAR element need only address integration or compatibility issues for a single designated SAR element. Additionally, this SAR configuration provides increased scalability for the network and allows increased bandwidth for associated network equipment as bottlenecks at the line card, resulting from the SAR processing at each line card, are effectively eliminated.

Embodiments of the present invention may enjoy some, all, or none of these advantages. Other technical advantages are readily apparent to one skilled in the art from the following figures, the description, and the claims.

BRIEF DESCRIPTION OF THE DRAWINGS

Reference is made to the following description taken in conjunction with the accompanying drawings in which:

FIG. 5 is a flowchart illustrating a series of steps associated with data propagation within the communication system of FIG. 1.

DETAILED DESCRIPTION OF EXAMPLE EMBODIMENTS OF THE INVENTION

Example embodiments of the invention are best understood by referring to FIGS. 1 through 5 of the drawings in which like numerals refer to like parts.

Figure 1:
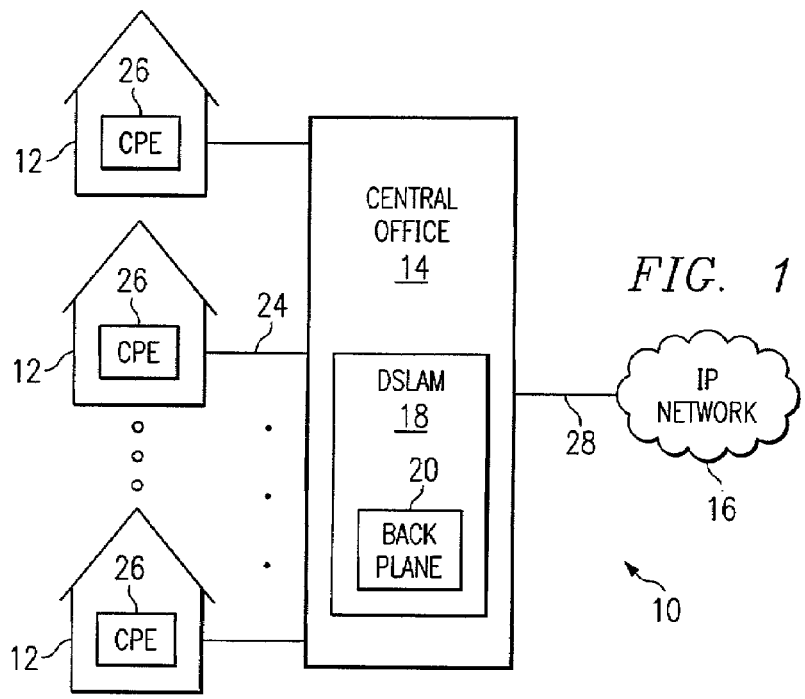
FIG. 1 is a simplified block diagram of a communication system in accordance with one embodiment of the present invention.

FIG. 1 is a block diagram of a communication system 10 in accordance with one embodiment of the present invention. Communication system 10 includes an end user 12, a central office 14, and an internet protocol (IP) network 16. Central office 14 includes a digital subscriber line access multiplexer (DSLAM) 18, which further comprises a backplane 20. Central office 14 may receive data packets in the form of asynchronous transfer mode (ATM) cells at DSLAM 18.

According to the teachings of the present invention, DSLAM 18 receives one or more ATM cells and wraps each of them in Ethernet-compatible segments in order to generate one or more Ethernet frames. Network equipment within communication system 10, which receives the Ethernet frames, does not recognize the ATM cells within the Ethernet formatting. Thus, the network equipment is duped into thinking that the entire data packet, including its payload contents, adheres to an Ethernet communication protocol. This Ethernet wrapping does not affect the integrity of the data payload and significantly reduces the complexity of components within communication system 10. Details relating to the wrapping execution and the resulting Ethernet frame structure, which includes the ATM cell, are provided below with reference to FIGS. 2 through 4.

End user 12 is a person or an entity that initiates an ATM communication in a network environment. Alternatively, end user 12 may be any network element, such as a computer, a database, a program, or any other suitable element seeking to initiate a communication in communication system 10. End user 12 is coupled to central office 14 by a digital subscriber line (DSL) 24 that carries information or data from end user 12 to central office 14. DSL 24 can carry both data and voice signals, where the data portion of the line may be continuously connected. Data, as used herein in this document, refers to any type of numeric, voice, or script data, or any other suitable information in any appropriate format that may be communicated from one point to another. Communication system 10 may include multiple end users 12 having multiple DSLs 24 coupling each end user 12 to central office 14.

In a particular embodiment, end user 12 may initiate an ATM communication using a personal computer; however, end user 12 may initiate an ATM communication with any suitable component or device, such as a personal digital assistant (PDA), a laptop, or an electronic notebook, for example. The personal computer may be coupled to or inclusive of a customer premise equipment (CPE) unit 26. CPE 26 is a piece of network equipment that is coupled to the architecture of end user 12 and a telecommunications network unit, such as central office 14 for example, which is located in proximity to end user 12. CPE 26 may include any subscriber equipment, such as standard modems, cable modems, asymmetric DSL (ADSL) modems, DSL modems, phone sets, fax equipment, answering machines, point of sale (POS) equipment, or private branch exchange (PBX) systems, for example. CPE 26 may provide various on-premise functions. In operation of a particular embodiment, CPE 26 functions as a DSL modem, enabling a personal computer to transmit data over DSL 24.

Central office 14 is a network office that comprises switching equipment, which functions to receive and to retransmit data received from end user 12. Central office 14 may be positioned in a locality where end user 12 is connected on a local loop. Local loop refers to the connection lines from a telephone company's central office, which is in a locality of its subscriber's telephones, to its client end users 12. The local loop may carry digital signals directly to and from end user 12 and IP network 16.

DSLAM 18 is a network device within central office 14 that receives signals from multiple end users 12 over DSL 24 connections and communicates the signals using multiplexing techniques. Multiplexing refers to the communication or transmission of multiple signals or streams of information on a carrier at the same time in the form of a single, complex signal and then recovering the separate signals at a receiving end. DSLAM 18 may enable a phone company or service provider to offer multiple end users 12 DSL technology. DSL generally refers to a protocol for bringing high-bandwidth data or information to homes and businesses over telephone lines. DSL, as referred to herein in this document, is inclusive of variations of DSL, such as ADSL, high-bit rate DSL (HDSL), rate-adaptive DSL (RADSL), and xDSL. DSLAM 18 may facilitate data conversion from a raw format, in certain instances, to an ATM format and to an Ethernet format where appropriate at ATM adaptation layers one through five (AAL1–AAL5). Additional details relating to DSLAM 18 are provided below with reference to FIGS. 2 and 4.

Backplane 20 is a physical piece of printed circuit board with accompanying connectors that receive one or more line cards. Backplane 20 provides a communicative interface between two or more components within DSLAM 18. Backplane 20 may include hardware, software, circuitry, or any other component or object operable to facilitate data propagation within DSLAM 18. Backplane 20 may be configured in order to accommodate ATM cell communications, Ethernet communications, IP communications, peripheral component interconnect (PCI) communications, or any other suitable communication protocol where appropriate. In addition, backplane 20 may be designed to provide a custom backplane solution in implementing two or more of these communication protocols into a single backplane 20. In a particular embodiment, backplane 20 connects multiple line cards and offers conductivity to components coupled to backplane 20 in order to communicate information across backplane 20 in an Ethernet format. This communication is described in greater detail below with reference to FIG. 2.

IP network 16 represents a series of points or nodes of interconnected communication paths for receiving and transmitting packets of information that propagate through communication system 10. IP network 16 offers a communications interface between central office 14 and additional network equipment coupled to IP network 16. A communications link 28 couples IP network 16 to central office 14. Communications link 28 may be any connection (direct or indirect) capable of facilitating data transmission and reception in a network environment. IP network 16 may be any local area network (LAN), metropolitan area network (MAN), or wide area network (WAN), or any other appropriate architecture or system that facilitates communications in a communication system 10. IP network 16 implements a transmission control protocol/internet protocol (TCP/IP) communications language architecture in a particular embodiment of the present invention; however, IP network 16 may alternatively implement any other suitable communication protocol for transmitting and receiving data packets within communication system 10.

Figure 2:
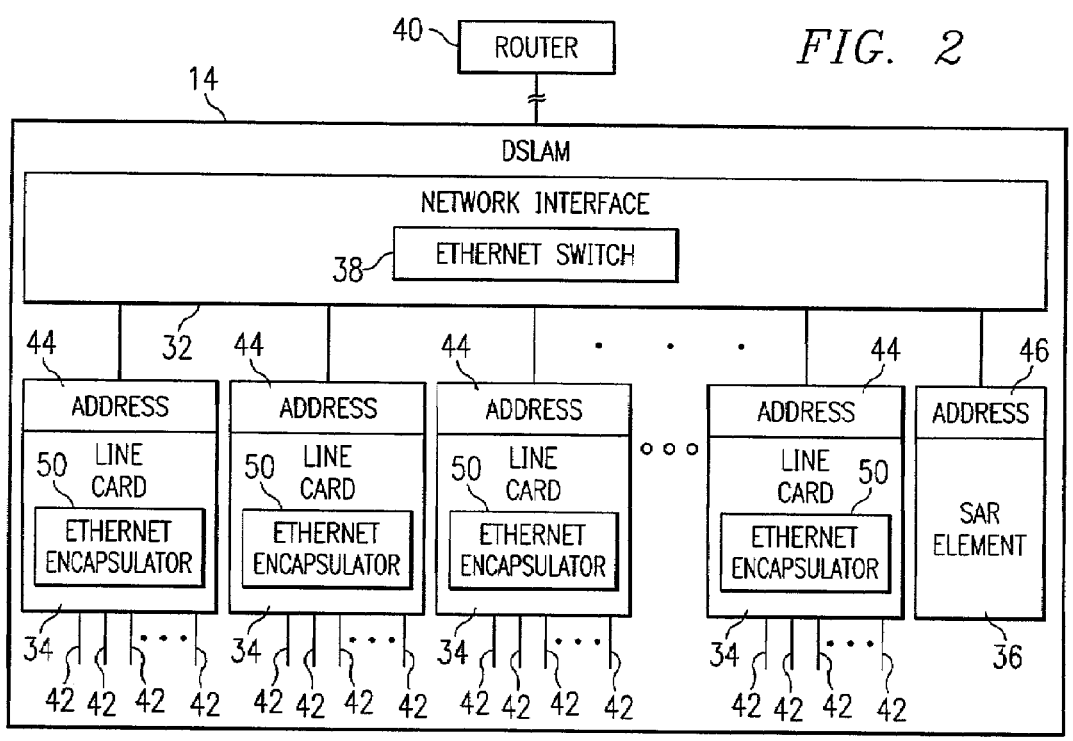
FIG. 2 is a simplified block diagram of a digital subscriber line access multiplexer (DSLAM) included within the communication system of FIG. 1 in accordance with one embodiment of the present invention.

FIG. 2 is a block diagram illustrating additional details of DSLAM 18 in accordance with one embodiment of the present invention. DSLAM 18 receives one or more ATM cells and processes each cell in order to generate Ethernet packets to be transmitted from DSLAM 18 to a next destination. DSLAM 18 operates to provide an efficient and a seamless conversion of data from an ATM format to an Ethernet format across backplane 20. DSLAM 18 includes a network interface 32, a series of line cards 34, and a segmentation and reassembly (SAR) element 36. In addition, DSLAM 18 may be coupled to a router 40 that receives data after the data is processed by DSLAM 18.

According to the teachings of the present invention, DSLAM 18 receives one or more ATM cells and adds Ethernet segments or encapsulants to each of them such that certain network equipment within communication system 10 does not recognize the ATM cells within the Ethernet formatting. The network equipment is duped into thinking that the entire data packet adheres to an Ethernet communication protocol. This Ethernet wrapping does not affect the integrity of the data payload and significantly reduces the complexity of components within communication system 10. Details relating to the wrapping execution and the resulting Ethernet frame structure, which includes the ATM cell, are provided below with reference to FIGS. 3A, 3B and 4.

Each line card 34 comprises a series of ports 42 and an address element 44. Line cards 34 operate as satellite cards, with network interface 32 providing a central communications point or node. Address element 44, provided on each line card 34, enables a point-to-point connection with network interface 32 via backplane 20. Address element 44 allows network interface 32 to determine from which line card 34 data was received. Address element 44 may also provide an identification capability at a port (42) level of each respective line card 34. Address element 44 is a media access control (MAC) address in a particular embodiment; however, address element 44 may alternatively be any unique addressing element that distinguishes line cards 34 from each other or from other network equipment.

In a particular embodiment of the present invention, line cards 34 are multi-port DSL line cards, providing a series of ports 42 per line card (for example 8:1, 20:1, etc.). Line cards 34 are subscriber line cards, which integrate multiple interfaces for both voice services and Internet/data access; however, line cards 34 may be any other suitable type of single or multi-port card, such as a processor line card supporting software-driven services and host system control, for example. Line card 34 may also be a trunk card supporting multiple WAN interfaces, i.e. gigabit Ethernet or synchronous optical network (SONET)/synchronous digital hierarchy (SDH), for example.

Line cards 34 each include an Ethernet encapsulator 50. Each line card 34 may also include an element that recognizes the type of communication protocol being received at ports 42 such that incoming data units, which are already in an Ethernet format, are unmodified and communicated to Ethernet switch 38. Ethernet encapsulator 50 may be any hardware or software that operates to receive an ATM cell and to position an Ethernet wrapper around the ATM cell such that the integrity of the ATM cell is maintained while the data packet is converted into an Ethernet-compatible format. For a better understanding of the Ethernet wrapping execution, reference is made to FIGS. 3A through 3C.

Figure 3A:
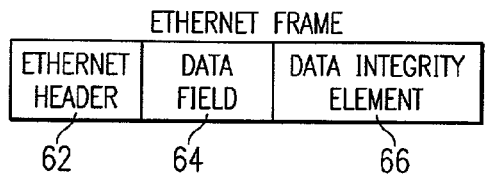
FIG. 3A is a block diagram of an example format of an Ethernet frame in accordance with one embodiment of the present invention.

FIG. 3A is a block diagram of an example format for an Ethernet frame 60 implemented in network communications. In a sample networking context, Ethernet traffic may be transported in units of Ethernet frames 60. These sections within Ethernet frame 60, such as the source and destination address sections, may be truncated or compressed where appropriate in order to minimize or otherwise modify the length of the data packet. An example form of Ethernet frame 60 is illustrated in FIG. 3A, which includes an Ethernet header 62, a data field 64, and a data integrity element 66.

Ethernet header 62 may be an Ethernet-compatible MAC header in accordance with a particular embodiment of the preset invention and represents a portion of Ethernet frame 60 that facilitates the propagation of data through a network environment. Alternatively, Ethernet header 62 may be any suitable type of header that is Ethernet-compatible and that assists in directing data in a network environment. Ethernet header 62 may include a preamble field of 64 bits used for synchronization, a destination address/Ethernet address of the destination host that is 48-bits, a source address/Ethernet address of the source host that is 48-bits, and a section identifying the type of data encapsulated, which is 16-bits. The portions within Ethernet header 62 operate to provide information about the data packet and facilitate the delivery of data field 64.

Data field 64 is the portion of Ethernet frame 60 that includes the information or payload to be delivered to an end point. Data field 64 may be between approximately 46 and 1500 bytes. Data field 64 may also include a destination address/internet address of the destination host and a source address/internet address of the source host. The data within data field 64 to be sent through communication system 10 is encapsulated by each layer of the communication protocol, from the application layer to the physical layer, where each layer adds its own header information. When data is received at a node, each layer strips off the header and then passes the packet to the next layer. The transport layer ensures that the source and the destination (hosts and ports) can be identified, and includes a sequence number so that a file can be broken into multiple packets and recombined on a receiving end. The internet layer determines how data field 64 will be delivered, including fragmenting them to send along a path with a smaller maximum transmission unit (MTU) or recombining them for a larger MTU path where appropriate. The internet layer also determines the path used to get to the destination. The network layer provides the encapsulation of the datagram into Ethernet frame 60 to be transmitted over the network. The network layer includes the Ethernet addresses of the source machine and of the next point toward the destination.

Data integrity element 66 is a cyclic redundancy check (CRC) section in accordance with one embodiment of the present invention. Alternatively, data integrity element 66 may be any information verification tool used for error detection in a communications context. Data integrity element 66 may be a 6–12 bit data portion that checks for single-bit or multi-bit errors. In a particular embodiment of the present invention, data integrity element 66 is 32-bits wide, positioned as the last 4 bytes of Ethernet frame 60. Alternatively, data integrity element 66 may be any suitable length or occupy any requisite space within Ethernet frame 60 according to particular needs. Data integrity element 66 may check for the correctness of the header field or of the payload, or for both where appropriate.

Figure 3B:
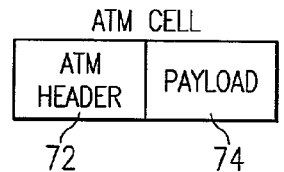
FIG. 3B is a block diagram of an example format of an asynchronous transfer mode (ATM) cell in accordance with one embodiment of the present invention.

FIG. 3B is a block diagram of an example format for an ATM cell 70. ATM cell 70 is the fixed length data unit used to transmit ATM data and may be any suitable length and comprise any number of parts where appropriate. In the context of ATM communications, all data is switched and multiplexed in one or more ATM cells. The ATM data may be positioned in a 48-byte payload section 74 and may be preceded by a 4–6 byte ATM header 72. Header 72 includes information about the contents of payload section 74 and may include information relating to the method of transmission for the data. The sections within header 72 are a series of bits, which are recognized and processed at the ATM layer. Header 72 may include a generic flow control (GFC), cell loss priority (CLP), payload type indication, header error control, a virtual path identifier, and a virtual channel identifier. Payload section 74 also includes the data sought to be communicated from one point to the next by any component or element within communication system 10.

Figure 3C:
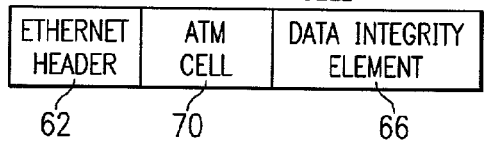
FIG. 3C is a block diagram an ATM cell in an Ethernet format in accordance with one embodiment of the present invention.

FIG. 3C is a block diagram ATM cell 70 in an Ethernet format in accordance with the teachings of the present invention. Ethernet encapsulator 50 operates to receive one or more ATM cells, such as the example ATM cell 70 provided in FIG. 3B, and wraps each ATM cell 70 in an Ethernet frame that includes Ethernet header 62 and data integrity element 66. The integrity of each ATM cell is maintained as the entire cell is positioned within an Ethernet frame as illustrated in FIG. 3C. With the Ethernet wrapper in place, the entire data packet is communicated from line card 34 to Ethernet switch 38, which only recognizes the Ethernet wrapping and not the internal ATM payload. In this sense, Ethernet switch 38 is duped into thinking that it is receiving standard Ethernet frames.

Referring back to FIG. 2, Ethernet switch 38 is a switching element that receives and distributes packets of information. As described above, Ethernet switch 38 does not recognize the ATM payload inside an incoming Ethernet frame and may only recognize or identify the Ethernet wrapper provided by Ethernet encapsulator 50. Ethernet switch 38 distributes or otherwise communicates an Ethernet frame from network interface 32 to router 40 after segmentation and reassembly is performed on the Ethernet packet as described below.

Figure 4:
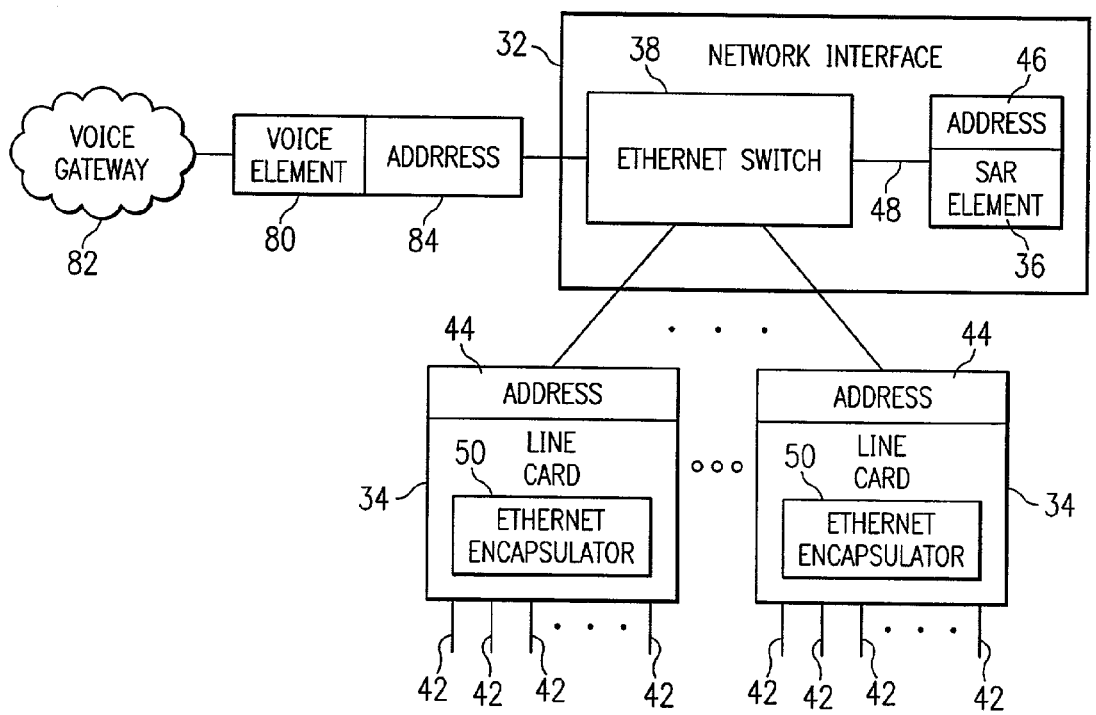
FIG. 4 is a simplified block diagram of an alternative embodiment of a portion of the DSLAM of FIG. 2.

SAR element 36 is a line card that has the ability to segment and to reassemble Ethernet packets according to a particular embodiment of the present invention. SAR element 36 may also recognize Ethernet frames transmitted by one or more line cards 34, or by ports 42. In addition, SAR element 36 may be a commonly known component that provides segmentation and reassembly functions for incoming data. Alternately, SAR element 36 may be a dedicated processor, or some other suitable network component, such as a network processor for example (commonly referred to as a network processor blade), that performs some SAR functionality or that receives a download of SAR execution instructions from some other element within or external to communication system 10. SAR element 36 may include any software or hardware that performs these functions. SAR element 36 may alternatively be positioned on network interface 32 (as illustrated in FIG. 4) or positioned on a dedicated piece of hardware or software. One advantage of SAR element 36 relates to its positioning within the network. The "SARing" execution provided by SAR element 36 is removed from line cards 34 and may be positioned on network interface 32, on a separate line card 34, or on a dedicated piece of hardware. This architecture is more economical as the SAR task is performed by a single element at a designated location. This single point SAR designation also offers greater flexibility to the network because network equipment that interacts with SAR element 36 need only address integration or compatibility issues for a single designated SAR element 36.

SAR element 36 may include a unique address element 46, which may be a MAC address for example. Address element 46 identifies SAR element 36, which allows SAR element 36 to receive data directed by other network equipment. For example, an ATM cell propagating through communication system 10 may pass directly from a point on line card 34 to SAR element 36 after the Ethernet wrapper has been provided by Ethernet encapsulator 50. This may be executed by line card 34, which sets the destination address to address element 46 of SAR element 36 and the source address to address element 44 of line card 34. SAR element 36 may operate to provide a segmentation of ethernet data into a size suitable for the payload of the consecutive ATM cells of a virtual connection for delivery to line cards 34 via Ethernet switch 38. SAR element 36 may also provide for the inverse operation, reassembly of contents of the cells of a virtual connection into data units to be delivered to communications link 28 or router 40 via Ethernet switch 38.

In operation, SAR element 36 is initiated after receiving an information packet from Ethernet switch 38 of network interface 32. SAR element 36 may then section and reassemble multiple Ethernet frames such that the original segmentation provided by CPE 26 is resolved by reconstructing the sectioned Ethernet segments into one or more Ethernet packets. SAR element 36 may then transmit the reassembled data as single Ethernet packets to Ethernet switch 38 with a new destination address positioned there by SAR element 36. From Ethernet switch 38, the Ethernet packet may then be communicated from network interface 32 to a next destination in the network, such as router 40, for example.

Router 40 is a device or piece of software that determines the next network point to which a packet of information should be forwarded. Router 40 may be coupled to DSLAM 18 (directly or indirectly) and may additionally be coupled to a network or another router. Router 40 may be positioned at any gateway (where one network meets another), or included as part of a network switch. Alternatively, DSLAM 18 may include router 40 or router 40 may be included within central office 14. In operation, router 40 may receive data from DSLAM 18, in any suitable communications format, and forward the data to a next destination.

FIG. 4 is a simplified block diagram of an alternative embodiment of a portion of DSLAM 18. DSLAM 18 may include SAR element 36 positioned directly on network interface 32. The segmentation and reassembly of data packets is performed in the same manner as described above with reference to FIG. 2. A communications link 48 may couple Ethernet switch 38 and SAR element 36. Communications link 48 may be a direct or an indirect connection in providing a communicative interface between SAR element 36 and Ethernet switch 38.

FIG. 4 also illustrates and alternative embodiment of the present invention that includes the addition of a voice element 80, which is coupled to a voice gateway 82. Voice cells propagating within communication system 10 may have special requirements for processing. Voice cells may be processed using voice element 80. Voice element 80 processes voice data received from Ethernet switch 38. Additionally, each line card 34 may include an element (potentially within Ethernet encapsulator 50) that recognizes a voice packet requiring special processing. Line card 34 may then wrap the voice cell in an Ethernet wrapper as described above. Line card 34 may then directly communicate the wrapped voice data to voice element 80 by setting the destination address to match an address element 84 of voice element 80. Line card 34 may alternatively communicate the wrapped voice data to Ethernet switch 38, which forwards it to voice element 80. Address element 84 may be a MAC address or any unique identification element that distinguishes voice element 80 in a network. The voice data may then travel from voice element 80 to voice gateway 82.

Voice gateway 82 is a network point or node that operates as a data exchange interface between voice element 80 and another network connection or node. Voice gateway 82 may also represent a traditional voice network (or a connection thereto), providing a communicative interface for voice data propagating between two nodes. Voice gateway 82, which receives the voice data traffic from voice element 80, processes the voice data where appropriate and then communicates the data to another network component or object. In one sense, the data propagation for voice data may be slightly different from other forms of data propagation. This is because voice data does not need to return to Ethernet switch 38 before being communicated to a next destination. Voice data may move from Ethernet switch 38 to voice element 80 and on to voice gateway 82 without returning to Ethernet switch 38 before being communicated further.

Alternatively, voice service may be delivered by bypassing a traditional network accessed by voice gateway 82. This form of voice over IP may require a dedicated voice element to provide echo cancellation and other digital signal processing (DSP) functions where appropriate. In such a case, voice element 80 may be a DSP blade that, upon performing requisite signal processing functions on the voice packets, returns them to network interface 32, which may in turn forward the voice packets to CPE 28 or DSL 24 (depending on the direction of propagation of the voice packet).

FIG. 5 is a flowchart illustrating a series of example steps associated with data propagation within communication system 10. Data propagation generally begins when end user 12 initiates a communication flow in communication system 10 from any suitable device, such as a personal computer, for example. The personal computer may then transmit an IP packet to a network interface card within or coupled to the personal computer. The network interface card takes the IP packet and transforms it into an Ethernet format to be communicated to CPE 26. At step 100 as illustrated in the flowchart of FIG. 5, the Ethernet-formatted packet is received at CPE 26, which could be included in a modem coupled to or integral with CPE 26. CPE 26 receives the IP packet request (over Ethernet) and converts or sections the data into ATM cells at step 102. CPE 26 then transmits the ATM cells to one or more line cards 34 of DSLAM 18 at step 104.

Ports 42 of line card 34 receive each ATM cell and communicate the ATM cells to Ethernet encapsulator 50. Ethernet encapsulator 50 wraps each ATM cell in an Ethernet wrapper at step 106. Each ATM cell is then sent to network interface 32 at step 108. At step 110, Ethernet switch 38, within network interface 32, may then direct the data to SAR element 36, which is within or external to network interface 32.

At step 112, SAR element 36 executes reassembly (and segmentation operations where appropriate) of the incoming Ethernet wrapped ATM cells, resulting in a series of Ethernet packets to be communicated back to Ethernet switch 38 at step 114. SAR element 36 operates to effectively reconstruct information originally segmented by CPE 26. Once Ethernet switch 38 receives the Ethernet packets, Ethernet switch 38 may then communicate this information, with the assistance of network interface 32, to a next destination, such as router 40, for example.

Router 40 may direct the incoming Ethernet packets, based on the Ethernet header information, to any point within or external to a network. For example, router 40 may direct the Ethernet packets to a web site such as yahoo.com. In sending packets back to end user 12, yahoo.com generates an IP packet that gets transmitted from a server coupled to, or in communication with, the yahoo.com web site. Network interface 32 may then receive the packet from router 40 and forward it to Ethernet switch 38, which transmits the packet to SAR element 36.

SAR element 36 executes segmentation (and reassembly where appropriate) of the packet. SAR element 36 converts the incoming packet into ATM cells and then places an Ethernet wrapper around each of the ATM cells. SAR element 36 then forwards the Ethernet-wrapped ATM cells to Ethernet switch 38. Ethernet switch 38 then communicates the Ethernet-wrapped ATM cells to particular line cards 34 (which correlate to end users 12 that originally requested the information from yahoo.com) Each line card 34 then removes the Ethernet wrapper and communicates the information as ATM cells to end user 12 via ports 42.

Although several embodiments have been illustrated and described in detail, it will be understood that various substitutions and alterations can be made therein without departing from the teachings of the present invention. For example, although FIGS. 2 and 4 illustrate line cards 34, SAR element 36, and network interface 32 in certain positions within communication system 10, these elements may be located in any suitable area in the network without departing from the scope of the present invention. For example, SAR element 36 may be positioned external to DSLAM 18 where appropriate, provided connectivity is maintained with DSLAM 18. Similarly, although CPE 26 is illustrated in conjunction with end user 12, CPE 26 may be located within DSLAM 18 or positioned in any suitable point in DSL 24.

Additionally, although Ethernet encapsulator 50 is illustrated as being within line card 34, Ethernet encapsulator 50 may be external to line card 34 and provided as a separate component, where appropriate, without departing from the teachings of the present invention. In such a case, Ethernet encapsulator 50 would be a single unit that operates to wrap incoming ATM cells in an Ethernet-compatible format before communicating the wrapped ATM cells to one or more line cards 34. Numerous other changes, substitutions, variations, alterations, and modifications may be suggested to one skilled in the art, and it is intended that the present invention encompass all such changes, substitutions, variations, alterations, and modifications as following within the spirit and scope of the appended claims.

What is claimed is:

1. An apparatus for communicating data, the apparatus comprising:
   a line card operable to receive one or more asynchronous transfer mode (ATM) cells, the line card including:
      an Ethernet encapsulator operable to generate one or more Ethernet frames that each comprise one of the ATM cells received by the line card, an Ethernet-compatible header, and a data integrity element, wherein the line card is operable to communicate one or more of Ethernet frames to a network interface, and wherein the network interface comprises an Ethernet switch operable to receive and to direct one or more of the Ethernet frames;
   a segmentation and reassembly (SAR) element coupled to the network interface and operable to receive one or more of the Ethernet frames communicated by the Ethernet switch, wherein the SAR element is operable to segment one or more of the Ethernet frames into portions and to reassemble one or more of the portions in order to generate one or more Ethernet packets, the SAR element communicating one or more of the Ethernet packets to the Ethernet switch; and
   wherein the SAR element includes a unique MAC address, said unique MAC address identifies the SAR element and allows SAR element to receive data directed by other network equipments.

2. The apparatus of claim 1, wherein one or more of the ATM cells comprise voice data, and wherein the Ethernet switch is operable to direct the voice data to a voice element, the voice element being coupled to the network interface and operable to process the voice data.

3. The apparatus of claim 2, further comprising a voice gateway operable to receive the voice data from the voice element.

4. The apparatus of claim 1, further comprising a backplane operable to provide a communicative interface between the network interface, the line card, and the SAR element.

5. The apparatus of claim 4, wherein the backplane is configured to communicate information in an Ethernet format.

6. A method for communicating data, comprising:
   receiving an asynchronous transfer mode (ATM) cell at a line card;

generating an Ethernet frame that comprises the received ATM cell, an Ethernet-compatible header, and a data integrity element;
communicating the Ethernet frame to a first destination;
receiving the Ethernet frame at the first destination and directing the Ethernet frame to a second destination;
segmenting the Ethernet frame into portions at the second destination and reassembling the portions in order to form an Ethernet packet; and
communicating the Ethernet packet to the first destination;
wherein the second destination is a segmentation and reassembly (SAR) element and wherein said SAR element includes a unique MAC address, said unique MAC address identifies the SAR element and allows SAR element to receive data directed by other network equipments.

7. The method of claim 6, further comprising communicating voice data to a voice element that processes the voice data, wherein the ATM cell comprises the voice data.

8. The method of claim 7, further comprising receiving the voice data from the voice element at a voice gateway.

9. The method of claim 6, further comprising providing a communicative interface between the line card, the first destination, and the second destination.

10. The method of claim 9, wherein the communicative interface is configured to communicate information in an Ethernet format.

11. A digital subscriber line access multiplexer (DSLAM), comprising:
a network interface including an Ethernet switch;
one or more line cards each operable to receive an ATM cell, each of the line cards including:
an Ethernet encapsulator operable to generate an Ethernet frame that comprises the ATM cell, an Ethernet-compatible header, and a data integrity element, wherein each of the line cards is operable to communicate the Ethernet frame to the Ethernet switch; and
a segmentation and reassembly (SAR) element coupled to the network interface and operable to receive the Ethernet frame communicated by the Ethernet switch, wherein the SAR element is operable to segment the Ethernet frame into portions and to reassemble the portions in order to generate an Ethernet packet, the SAR element communicating the Ethernet packet to the Ethernet switch; and
wherein the SAR element includes a unique MAC address, said unique MAC address identifies the SAR element and allows SAR element to receive data directed by other network equipments.

12. The DSLAM of claim 11, wherein the ATM cell comprises voice data, and wherein the Ethernet switch is operable to direct the voice data to a voice element, the voice element being coupled to the network interface and operable to process the voice data.

13. The DSLAM of claim 12, further comprising a voice gateway operable to receive the voice data from the voice element.

14. The DSLAM of claim 11, further comprising a backplane operable to provide a communicative interface for the line cards, the network interface, and the SAR element.

15. The DSLAM of claim 14, wherein the backplane is configured to communicate information in an Ethernet format.

16. A system for communicating data, comprising:
means for receiving an asynchronous transfer mode (ATM) cell;
means for generating an Ethernet frame that comprises the received ATM cell, an Ethernet-compatible header, and a data integrity element;
means for communicating the Ethernet frame to a first destination;
means for receiving the Ethernet frame at the first destination and for directing the Ethernet frame to a second destination;
means for segmenting the Ethernet frame into portions and for reassembling the portions in order to generate an Ethernet packet; and
means for communicating the Ethernet packet to the first destination;
wherein the second destination is a segmentation and reassembly (SAR) element and wherein said SAR element includes a unique MAC address, said unique MAC address identifies the SAR element and allows SAR element to receive data directed by other network equipments.

17. The system of claim 16, further comprising means for communicating voice data to a voice element that processes the voice data, wherein the ATM cell comprises the voice data.

18. The system of claim 17, further comprising means for receiving the voice data from the voice element.

19. The system of claim 16, further comprising means for providing a communicative interface between the first and second destinations.

20. The system of claim 19, wherein the means for providing the communicative interface is configured to communicate information in an Ethernet format.

21. A computer readable medium having instructions embodied thereon that when executed by a processor causes the processor to perform operations comprising:
receive an asynchronous transfer mode (ATM) cell;
generate an Ethernet frame that comprises the received ATM cell, an Ethernet-compatible header, and a data integrity element;
communicate the Ethernet frame to a first destination;
receive the Ethernet frame at the first destination and direct the Ethernet frame to a second destination;
segment the Ethernet frame into portions and reassemble the portions in order to form an Ethernet packet; and
communicate the Ethernet packet to the first destination;
wherein the second destination is a segmentation and reassembly (SAR) element and wherein said SAR element includes a unique MAC address, said unique MAC address identifies the SAR element and allows SAR element to receive data directed by other network equipments.

22. The computer readable medium of claim 21, further operable to communicate voice data to a voice element that processes the voice data, wherein the ATM cell comprises the voice data.

23. The computer readable medium claim 22, further operable to receive the voice data from the voice element.

24. The computer readable medium claim 21, further operable to provide a communicative interface between the first and second destinations.

25. The computer readable medium claim 24, wherein the software is configured to communicate information in an Ethernet format.

* * * * *